United States Patent [19]

Britton

[11] 4,206,443
[45] Jun. 3, 1980

[54] PROTECTIVE LOAD DISCONNECT UNIT FOR REMOTE LOAD CONTROL SYSTEMS
[75] Inventor: James S. Britton, Raleigh, N.C.
[73] Assignee: Westinghouse Electric Corp., Pittsburgh, Pa.
[21] Appl. No.: 878,857
[22] Filed: Feb. 17, 1978
[51] Int. Cl.² .............................................. H04Q 9/00
[52] U.S. Cl. ................................ 340/147 R; 307/38; 307/139; 361/66
[58] Field of Search .......... 340/310 A, 147 R, 310 R, 340/180, 186; 361/64, 66, 68, 69, 70; 307/139, 38, 85, 86

[56] References Cited
U.S. PATENT DOCUMENTS

| | | | |
|---|---|---|---|
| 3,906,242 | 9/1975 | Stevenson | 307/38 |
| 3,916,183 | 10/1975 | Duve | 250/206 |
| 3,964,023 | 6/1976 | Fauchez | 340/147 PC |
| 4,021,615 | 5/1977 | James | 340/147 R |
| 4,106,013 | 8/1978 | Cronin | 340/27 R |

Primary Examiner—Gareth D. Shaw
Assistant Examiner—Joel Miller
Attorney, Agent, or Firm—R. W. Smith

[57] ABSTRACT

A protective load disconnect unit is remotely controlled at a single control input terminal from a master controller and monitoring unit. A power switching circuit is actuated to switch a load to be controlled from on to off by a control signal from the master unit. The input terminal is maintained electrically isolated from the switching circuit. A load status response circuit senses the on-off conditions of the power switching circuit. A variable impedance circuit included in the load status response circuit is isolated from the power switching circuit and is connected to the input terminal. The on and off conditions of the power switching circuit changes the variable impedance circuit so that an electrical condition at the input terminal is varied to indicate the load status while the control signal concurrently actuates the switching circuit.

10 Claims, 2 Drawing Figures

PROTECTIVE LOAD DISCONNECT UNIT FOR REMOTE LOAD CONTROL SYSTEMS

BACKGROUND OF THE INVENTION

1. Field of the Invention

This invention generally relates to remote load control systems and more particularly to such systems including one or more protective load disconnect units suitable for load shedding and maximum demand control.

2. Description of the Prior Art

In remote load control systems, an electric power customer's loads are selectively energized and deenergized by a master load controller connected to each of loads to be controlled. Control signals from the load controller activate a power switching device such as a relay at each load location. It is often desirable in such systems to assure that the control signals are isolated and protected from the electric load power signals. Protection is especially required when the control signals are low level or have small signal strengths such as when generated by and/or are intended for operating low power electronic or other circuit devices. It is further often desirable for the controller to remotely monitor the on or off load status by a simple and efficient load sensing and reporting arrangement. The required operations are desired to be accomplished with simple, reliable, compact circuits which are simply, efficiently and economically manufactured.

In U.S. Pat. No. 3,906,242 a computerized utility peak load shaving system transmits radio control signals from a computer controlled central station to different groups of electric power customers. Receivers at each customer location operate on/off units which control separate power relays connected to a load. Electric load demand sensors at each customer location issue signals to a shut-down control at the central station.

In U.S. Pat. No. 4,021,615 electric appliances are turned off in rooms of a building by frequency signals transmitted from a central exchange through telephone lines to a signal detector associated with each room telephone. The detector operates a power relay to disconnect an associated appliance.

In U.S. Pat. No. 3,964,023 a remote load control system includes a master load controller connected by a pair of control lines to a plurality of slave units connected to loads to be controlled. Four types of control signals include either of two opposite polarities and two levels in each polarity. Each slave controller has an electronic servo circuit having an output circuit optically connected to the AC power load. The control signals provide voltages of a predetermined polarity and level to selectively exceed the thresholds of one or two voltage threshold devices. Photocells in the output load circuits are activated when the thresholds are exceeded. The two control feedlines are capable of generating four different operating conditions at the slave controllers. Neither load status sensing nor reporting of the load status back through the control feedlines is provided.

In U.S. Pat. No. 3,916,183 a power control device turns a lamp load off and on in response to ambient light and predetermined daily time cycles. Output contacts of two thermal current responsive relays are connected in series with the load. A photocell and a time controlled contact device produce current to the relay thermal elements. No remote control or status sensing features are provided.

Accordingly, prior art remote load control systems generally include control of a load by a controller circuit arrangement responsive to a master controller control signal. When status of the load is monitored, a separate sensing circuit arrangement and associated lead connections are required. Thus, several lead wire conductors are required for providing separate command and response for the separate remote control and remote monitoring functions. While it is known to isolate a load control signal from the electric power of a load to be controlled, no prior integral load sensing and disconnect unit provides for receiving a load turn-off control signal and responding with a load status response through a single control terminal that is isolated from both a power switching circuit and the power signal sensing input of a load status response circuit.

SUMMARY OF THE INVENTION

In accordance with the present invention a remote load control system includes a protective load sensing and disconnect unit for each electric load to be remotely controlled from a master load controller and monitor unit. A single isolated control input of the disconnect unit receives a control signal from the master unit through a single control line. A power switching circuit has contacts that are connected to the load and are opened in response to the control signal which is isolated from the load power signals. A load status response circuit in the remote disconnect unit has an input which senses either the power signals to the load or the contact actuating current. An output circuit of the status response circuit has a variable impedance which is isolated from the input of the status response circuit. The variable impedance is connected to the input terminal so as to vary the voltage thereat in response to the energized or deenergized state of the load.

In one aspect of the invention the master controller unit has, for each load to be controlled, has a signal source responsive to a communication signal transmitted to the power customer's location. The signal source produces a constant current control signal to an associated output connected to a single control line. A load status indicating circuit is connected with the output terminal and is responsive to changes in an electrical condition provided by a variable impedance connected to the input of the disconnect unit and varied by the load status. A further control line status indicating circuit is responsive to flow of the control signal between the output of the master controller unit and the input to the disconnect unit. A broken or discontinuous control line is detected since control signal flow from the master unit output will be interrupted. The present invention uniquely provides a protective load sensing and disconnect unit which is connected by a single control line conductor to a master controller and monitoring unit of a remote load control system. The control line conductor conducts a constant current signal effective to deenergize a load to be controlled and simultaneously monitors a change in the load energization status. The constant current signal develops different voltages at the disconnect unit input due to changes of a variable impedance in the load status response circuit. The control line is isolated from the power signals to the load so that low level electronic circuits of the master unit are protected when both generating a current limited control signal and when monitoring a load status response indication. The simple and novel arrangement of the disconnect unit avoids the necessity of a separate power supply and permits the use of compactly arranged parts capable of being mounted within a convenience outlet box commonly installed at residential power customers premises with simple wiring connections.

DETAIL DESCRIPTION OF THE PREFERRED EMBODIMENT

Figure 1:
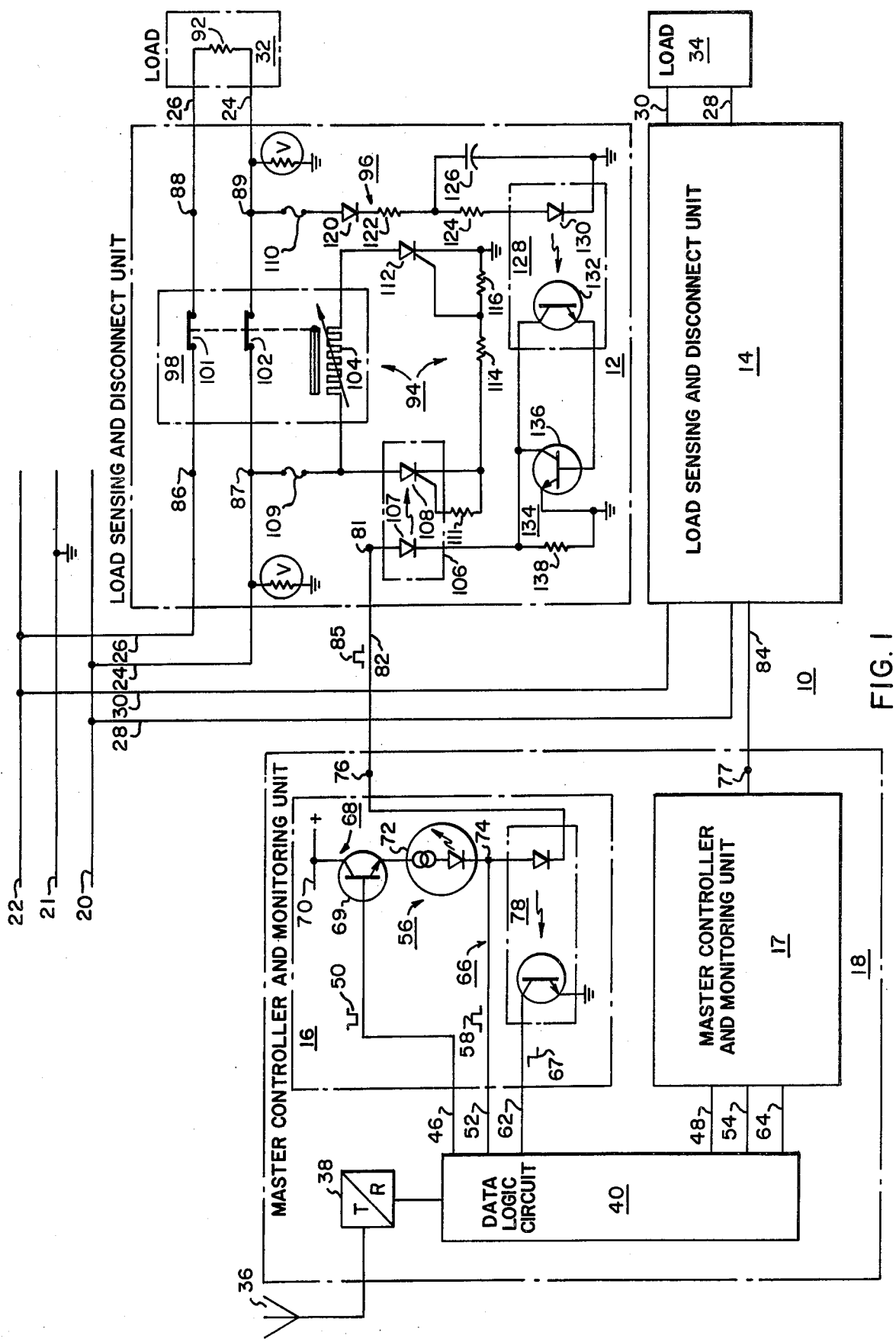
FIG. 1 illustrates a remote load control system made in accordance with the present invention.

FIG. 1 illustrates a remote load control system 10 including two identical load sensing and disconnect units 12 and 14 and master controller and monitoring units 16 and 17 made in accordance with the present invention. The master units 16 and 17 are included in a load control portion of a load management terminal (LMT) 18 disclosed in U.S. Pat. No. 4,130,874, issued Dec. 19, 1978, and assigned to the assignee of this invention. It is to be understood that the remote load control system 10 is not limited to use with the aforementioned LMT 18, however, the description herein is made with reference to the LMT 18 for a more complete understanding of the present invention.

The remote load control system 10 may be utilized at many power user or customer locations and is described herein for use at a residential customer's premises. AC electric power at the customer's wiring conductors 20, 21 and 22 is supplied from an electric utility distribution system. Two hundred forty volts is produced between the hot line conductors 20 and 22 and one hundred twenty volts is produced between either of the conductors 20 and 22 and the grounded neutral conductor 21. Separate ones of the load disconnect units 12 and 14 are connected in series with two separate branch circuits having two pairs of two hundred forty volt power conductors 24 and 26 and 28 and 30, respectively, connected to the conductors 20 and 22 as shown. The two branch circuits supply separate customer loads 32 and 34 to be remotely controlled. A neutral conductor may be included in the branch circuits that is connected between the neutral conductor 21 and the customer loads. The details and the manner of connecting the disconnect unit 12 is described in detail hereinbelow, it being understood that the unit 14 is correspondingly connected and arranged.

The general arrangement of the system 10 includes the LMT 18 with the master units 16 and 17 for receiving a communications signal via a suitable transmission link such as radio with a central station, not shown. Alternatively, the transmission link can include a power line carrier system described in the aforementioned application. An antenna 36 receives and transmits the communication signals and is connected to a transmitter and receiver unit 38 also described in the aforementioned application. The communication signals received at and transmitted from the LMT 18 include binary coded messages including address, command and interrogation and response functions. A data logic circuit 40, as described in detail in the aforementioned U.S. Pat. No. 4,130,874, controls the separate load control circuits, referred to herein as the master units 16 and 17 associated with a separate customer load to be controlled. Accordingly, the master units 16 and 17 include separate and identical circuits which are intended to replace the load control circuits generally described in the aforementioned application for controlling and monitoring of the customer loads to be controlled 32 and 34, respectively. A load turn-off command signal is produced on the conductors 46 and 48 from the logic control 40 to the master unit circuits 16 and 17, respectively. One such command signal 50 is shown at the conductor 46.

The LMT 18 is further capable of receiving a load status signal corresponding to the energized or deenergized condition of the load to be controlled and encoding such status signal for transmission back to a central station. Accordingly, a load status monitoring circuit arrangement is included in each of the circuits 42 and 44 and each is connected to logic circuit 40 via the conductors 52 and 54. A load status monitoring circuit 56 is shown in the master unit 16 for developing a load status indicating signal 58 on the conductor 52. The conductors 52 and 54 develop the status indicating signals from the master control unit 16 for indicating the status of the loads to be controlled 32 and 34, respectively.

Control line status monitoring circuits are further included in the master units 16 and 17 and are connected to the logic circuit 40 via the conductors 62 and 64. A control line status monitoring circuit 66 is shown in the master unit 16 for providing a control line status indicating signal 67 as described further hereinbelow.

The master unit 16 is now described in detail. A control signal source circuit 68 is included in the unit 16 and is provided by a solid state switch 69 formed by a transistor having the output collector and emitter electrodes connected in series with a power supply conductor 70. The conductor 70 has a positive twelve volts DC available within the LMT 18. The control or base electrode of the solid-state switch 69 is connected to the conductor 46 to be switched between nonconductive and conductive states by the binary high and low levels of the turn-off command signal 50. The load status monitoring circuit 56 includes a current limiter 72 connected in series between the solid state switch 69 and a junction 74 connected with the conductor 52. The current limiter is formed in one working embodiment by a type NSL 4944 LED circuit package available from National Semiconductor Corp., Santa Clara, CA. The current limiter 72 includes a light emitting diode (LED) and a current limiting circuit so that the voltage of the supply conductor 70 will not produce more than a maximum current of eighteen milliamps and typically limits current to thirteen milliamps at the junction 74.

The control line monitoring circuit 66 is connected in series between the junction 74 and an output terminal 76 of the unit 16. A corresponding output terminal 77 is provided for the unit 17. The circuit 66 in one working embodiment includes a type H11A4 LED-phototransistor optical coupler 78. The LED radiation source has its anode and cathode serially connected between the junction 74 and the output terminal 76. The radiation source is electrically isolated from the phototransistor radiation sensor which is connected between the status indicating conductor 62 and ground. With the solid-state switch 69 being conductive, the signal source circuit 68 produces current flow through the current limiter 72 and the radiation source of the circuit 66 to turn-on the associated phototransistor detector and produce a change in the binary logic state of the signal 67 in the conductor 62, when there is current flow through the output terminal 76.

Referring now to the load sensing and disconnect unit 12 a detailed description is made hereinafter, it being understood that the disconnect unit 14 is made and connected in the same manner as is the unit 12. A single control input terminal 81 is connected to a single control line conductor 82 also connected to the output terminal 76 of the master unit 16. Correspondingly, a control line conductor 84 is connected from the output terminal 77 to the disconnect unit 14. A current limited control signal 85 is produced on the control line 82 in response to the activation of the control signal source 68 and the operation of the current limiter 72. A substantially constant current value of approximately twelve milliamps flows in control line 82 when the signal 85 is produced.

Line-side power terminals 86 and 87 and load-side power terminals 88 and 89 provide series connections of the disconnect unit 12 with the branch circuit power conductors 24 and 26 and the customer load to be controlled 32. The pair of terminals 86 and 88 are connected in series with the conductor 26 and the pair of terminals 87 and 89 are connected in series with the conductor 24. The resistance element 92 represents a typical two hundred forty volt electric energy consuming element in the customer load to be controlled 32 such as an electric hot water heater. The load to be controlled 34 may include another typical customer load energy consuming element such as an air conditioner which, like the hot water heater load, is a major electrical load.

The circuits of the disconnect unit 12 include a power switching circuit 94 and a load status response circuit 96. The switching circuit 94 includes a power relay or load contactor 98 provided by a Klixon Relay available from Texas Instruments Inc. in one working embodiment. The load contactor 98 has pairs of output switch contacts 101 and 102 connected in series with the two pairs of power terminals 86 and 88 and 87 and 89, respectively. The contactor 98 further includes an actuator element 104 that is effective to operate the switch contact pairs 101 and 102 from a normally closed or inactive and switch-on state to an open or active switch-off state. The actuator element 104 has a temperature dependent resistance characteristic so that when current is initially applied to the element 104 the resistance is low and the element heats up rapidly and increases resistance with increased temperature. A thermally actuated disc moves the normally closed pairs of contacts 101 and 102 to an open-state and the contacts will remain open with element 104 drawing a substantially low level of current due to the high resistance thereof. When current is removed from the actuator element 104 the element cools and acquires approximately two minutes before the switch contacts are returned to the closed state. The cooling times of the actuator element 104 varies between the different ones of the contactors due to manufacture tolerance ranges and ambient temperature so that the time after current is removed from the element 104 may vary two minutes ± thirty seconds before the contact pairs 101 and 102 close. This has the advantage of randomly reconnecting loads to be controlled to the AC power distribution system of a utility company when a large number of customers are provided with a remote load control system 10. The random delay times before energization of the loads prevents a large surge due to simultaneously reconnecting large numbers of loads to the utility distribution systems.

The power switching circuit 94 has an isolated control and actuating input circuit in which control and actuating portions thereof are electrically isolated and coupled together by an isolated control means formed by optical coupler type H11C6, in one working embodiment, and designated by the numeral 106. The isolated control means 106 includes two inputs and two outputs connected across an LED radiation source 107 and a photo responsive solid-state control rectifier (SCR) radiation detector 108, respectively. The control portion of the input circuit includes the radiation source 107 connected in series with the control input terminal 81. The isolated control means 106 is turned on by the control signal 85 occurring on the input terminal 81. The actuating portion of the input circuit of circuit 94 includes the cathode and anode output electrodes of the radiation detector 108 being connected to a source of operating voltage through one fuse 109 of two fuses 109 and 110 or equivalent protective devices connected to the conductor 24. The fuse 109 connects the radiation detector 108 in series with the line side power terminal 87 to provide circuit operating voltage thereat. A resistor 111 connects the SCR gate to the cathode of the SCR radiation detector 108 for proper biasing.

The switch actuating portion of the input circuit of the switching circuit 94 further includes the actuator element 104 connected through the fuse 109 to the power terminal 87 and to the anode output electrode of a gate controlled solid-state switch means formed by control rectifier (SCR) 112. The cathode output electrode of the SCR 112 is connected to ground. The gate electrode of the SCR 112 is connected through a resistor 114 to the cathode output electrode of the SCR radiation detector 108. The gate of the SCR 112 is further connected through a resistor 116 to ground to provide proper biasing thereat. The controlled rectifier 112 is provided by a type C106B1 in one preferred embodiment.

In operation of the power switching circuit 94 the radiation source 107 is connected in series between the input terminal 81 and ground through a portion of the load status response circuit 96 described further hereinbelow so as to not affect the operation of the isolated control means 106. The constant current control signal 85 energizes the radiation source 107 so that radiations therefrom activate the radiation detector 108 which is turned on during positive half cycles of the AC power signal at the terminal 87. The operating voltage from the line terminal 87 and through the radiation detector 108 provides a triggering signal to the SCR 112 gate which is turned-on to conduct AC power from the terminal 87 and through the relay actuator element 104. The element 104 develops heat which operates the pairs of switch contacts 101 and 102 to the active and open state. The AC power signals are removed from the load power terminals 88 and 89 and the customer load to be controlled 32.

When the control signal 85 is removed and a low binary state or zero current occurs in the control line 82, the radiation source 107 is not energized and does not radiate nor activate the radiation detector 108 so that it is turned off. The triggering input to the gate of the SCR 112 is removed and the SCR 112 is rendered non-conductive. The actuating portion of the power switching circuit 94 is deactivated by the SCR 112 becoming non-conductive and removing AC power from the actuator element 104. After the aforementioned cooling of the actuator element 104, the switch contact pairs 101 and 102 return to the normally closed state. AC power signals from the load side terminals 88 and 89 are again applied to the load to be controlled 32 to return it to the energized condition. Thus, the operating voltages and currents obtained from the power terminal 87 to effect operation of the actuator 104 are isolated and insulated from the input terminal 81.

Referring now to the load status response circuit 96 of the detector unit 12, an input portion thereof includes a diode 120 being of a type 1N4005 having an anode connected to a source of operating voltage provided through the other fuse 110 connected to the load side power terminal 89. Resistors 122 and 124 are connected in series with the cathode of the diode 120 and a capacitor 126 is connected between the junction of the resistors 122 and 124 and ground to form a half wave rectified supply to another or second isolated control means 128 formed by an optical coupler. An LED radiation source 130 is connected across two inputs thereof and a phototransistor radiation detector 132 is connected across two outputs included in the optical coupler type of isolated control means 128. The radiation source 130 is connected in series with the resistor 124 and ground to complete the input portion of the circuit 96. The electrically isolated and insulated output portion of the circuit 96 includes the radiation detector 132 and a variable impedance circuit 134. A solid-state control device formed by a transistor 136 being of a type 2N2222A and a resistor 138 are included in the variable impedance circuit 134. The resistor 138 has one end connected to ground and the other end connected with the input terminal 81 through the two inputs of the isolated control means 106 including the radiation source 107. The collector to emitter output circuit of the transistor 136 is connected so that the emitter and collector thereof are connected in parallel and across the resistor 138. A base biasing control input of the transistor 136 is connected so that the collector and base are connected across the phototransistor radiation detector 132 in a darlington pair configuration.

In operation of the circuit 96, the AC power signals, occurring at the load side power terminals 88 and 89 when the load 32, are in an energized condition is sensed by current flow through the half wave rectifier circuit including the diode 120 to energize the radiation source 130 of the isolated control means 128. The radiations from the source 130 activate the phototransistor detector 132 which in turn biases the transistor 136 to a conductive state. The low resistance in the collector to emitter output circuit of the conductive transistor 136 provides a low resistance shunt path around the resistor 138 to ground. Thus, the input terminal 81 is connected through the radiation source 107 input of the isolated control means 106 to substantially ground potential through the conductive output circuit of the transistor 136. When the power relay or load contactor 98 contacts 101 and 102 are open and AC power signals are removed from the load side power terminals 88 and 89 and the load to be controlled 32, the input circuit of the load status response circuit 96 is deactivated and the operating voltage thereof is deenergized. The radiation source 130 of the isolated control means 128 is rendered to a deactivated state and the absence of radiation therefrom deactivates the radiation detector 132. The bias of the transistor 136 is removed and the collector to emitter output circuit thereof across the resistance 138 becomes non-conductive and at a very high impedance approaching a virtual open circuit. The resistor 138 is then effectively connected with the input terminal 81 through the radiation source 107. Thus, the variable impedance circuit 134 changes impedance between a very low resistance value and the higher resistance value of the resistor 138 in response to energized and deenergized conditions, respectively, of the load to be controlled 32. It is an important feature of the present invention that the variable impedance circuit 134 is responsive to the AC power signals supplied to the load to be controlled 32 and electrically isolated insulated therefrom so as to isolate the input terminal 81 from the AC power signals.

By way of example and not limitation the following are values for the resistors and the capacitor 126 of the disconnect unit 12:

| Resistor  | 110 | 47K ohms |
|-----------|-----|----------|
| "         | 114 | 47K "    |
| "         | 116 | 1K "     |
| "         | 122 | 47K "    |
| "         | 124 | 12K "    |
| "         | 138 | 1K "     |
| Capacitor | 126 | 1Mfd.    |

In operation of the system 10, the load sensing and disconnect unit 12 normally supplies the load to be controlled 32 through the conductors 24 and 26 and the normally closed pairs of output contacts 101 and 102 of the load contactor 98. The load contactor 98 is normally closed and in the inactive state so that there will be no interruption in the energization of the load if the system 10 fails to operate. Accordingly, there is no current flow in the control and actuating portion in the input circuit of the power switching circuit 94. The AC power signals to the load to be controlled 32 are detected by the load status response circuit 96. The variable impedance circuit 134 has a low resistance value since the transistor 136 is normally conductive when electric power is being supplied to the load to be controlled 32. This condition does not produce any changes in the indications in the master unit 16 until the signal 85 is received.

As is often required to reduce the peak load demand on an electric utility power generating capacity or to avoid serious overload conditions, the loads are turned off at a large number of electric power customers each having the remote control system 10. The load turn-off command data is received in a message transmitted to the LMT receiver and transmitter unit 38. The message data is decoded in the data logic circuit 40 and a turn-off command signal 50 is produced on the conductor 46 to the master controller and monitoring unit 16. The signal source circuit 68 is turned-on to produce the control signal 85 to the single control line 82 upon the solid state switch 69 being biased conductive by the command signal 50.

The load status monitoring circuit 56 maintains a constant or limited current value of the control signal 85 as it passes through the relatively low resistance load values of the photo diode radiation sources of the circuits 66 and isolated control means 106 and the low impedance of the variable impedance circuit 134. Accordingly, the load status indicating signal 58 on the conductor 52 remains in the low binary zero state since the junction 74 approaches a two volts level above ground due to the very small voltage drops across the radiation sources in the circuit 66 and isolated control means 106 and the conductive transistor 136 in the variable impedance circuit 134. The current of the signal 85 is maintained at the constant value of approximately twelve milliamps by the current limiter 72. Energization of the radiation source in the circuit 66 turns on the associated radiation detector due to current flow therein and initiates the control line status indicating signal 67 which, when applied to associated circuitry in the LMT circuit 40, goes from a high binary one state to a low binary zero state. If the control line 82 has been disconnected at the customer's premises, no current will flow to activate the photo transistor detector in circuit 66 when the signal source circuit 68 is activated. Thus, the status signal 67 will not produce a status indication, a binary zero, that the control signal 85 is being transmitted to the disconnect unit 12. The load status indicating signal 58 will remain at the same binary zero state when either the signal source 68 is off and no control current flows or when it is on and the load 32 to be controlled is still energized.

Upon the control signal 85 being received at the input terminal 81 of the disconnect unit 12, the input to the power switching circuit 94 at the isolated control means 106 causes the radiation detector 108 thereof to conduct and trigger the SCR 112 to a conductive state. The switching circuit 94 is activated by the operating voltage produced by current flow from the power terminal 87 and through the actuator element 104 and the SCR 112. The thermal actuation of the pairs of contactor contacts 101 and 102 by the actuator element 104 requires approximately thirty seconds to activate the contacts so they are in the open condition. The load to be controlled 32 is deenergized and power signals are removed from the power terminals 88 and 89.

The input to the load status response circuit 96 is deenergized with power removed from the terminal 89. The isolated control means 128 is turned off and the transistor 136 in the output of the circuit 96 is rendered non-conductive. The resistance of the resistor 138 is effectively placed in circuit with the input terminal 81 so that the variable impedance circuit 134 changes from a lower to a higher resistive impedance condition. Approximately ten to eleven volts is developed across the circuit 134 when it is in the higher impedance state wherein only a slightly measurable voltage is developed thereacross when the circuit 134 is in the lower impedance state. The voltage at the junction 74 in the monitoring circuit 56 rises to approximately eleven volts. A high or binary one state is produced in the status indicating signal 58 as long as the power is off to the load 32. The control signal 85 current continues to flow at the constant value and into the input radiation source of the isolated control means 106 and retain the switching circuit 94 active so that the pairs of contacts 101 and 102 remain open. The control line status signal 67 also will remain unchanged after the load is deenergized because the control signal current continues. The status signals 58 and 67 are applied to the logic circuit 40 so that a response message transmitted from the unit 38 of the LMT 18 will contain encoded data representing that the control signal 85 is being transmitted to the unit 12 and that the load 32 is deenergized.

When it is desired to reenergize the load to be controlled 32, a self-timer circuit in the data logic circuit 40 or a received turn-on command message to the LMT 18 initiates a termination of the turn-off command signal 50 so that it returns to its original or high binary one state.

The signal source 68 is turned off and the control signal 85 is removed from the output terminal 76 and the control line 82. The status signals 58 and 67 will return from the existing high and low binary one and zero states, respectively, to the low and high binary zero and one states, respectively. The input to the power switching circuit 94 becomes inactive. The pairs of output contacts 101 and 102 return to the closed state following the cooling time required by the thermal actuating operation in cooperation with the actuator element 104. The pairs of contacts 101 and 102 are closed after the aforementioned period of approximately one and one-half to two and one-half minutes. The load status response circuit 96 is again activated by the power signals at the load side power terminal 89. The variable impedance circuit 134 returns to the lower impedance state after the transistor 136 is rendered conductive. The last described status of the master controller and monitoring unit 16 and of the load sensing and disconnect unit 12 remains until another remotely controlled load turn-off cycle of operation is initiated.

Figure 2:
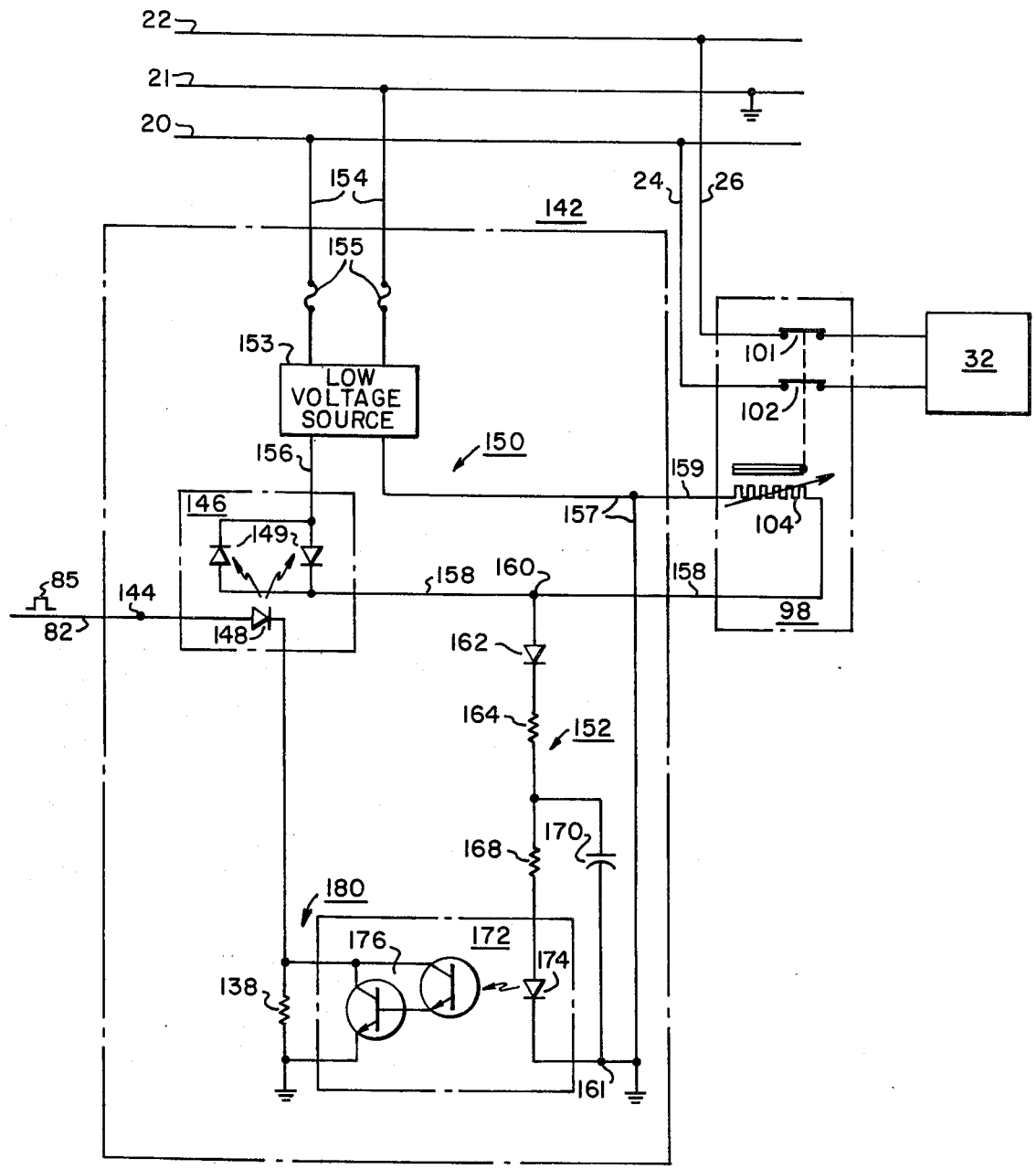
FIG. 2 is an alternative embodiment of a protective load sensing and disconnect unit included in the system shown in FIG. 1.

In FIG. 2 there is shown an alternative embodiment of a load sensing and disconnect unit 142 intended to replace the aforementioned disconnect unit 12 between the master controller unit 16 and the load to be controlled 32. The disconnect unit 142 includes the same power relay or load contactor 98, however, it may be mounted on or adjacent the load to be controlled 32 rather than in a common housing with the remaining portions of the disconnect unit 142. Essentially the same operating functions and features of the disconnect unit 12 are provided by simpler and fewer circuit components included in the disconnect unit 142.

A single control input terminal 144 corresponds to the terminal 81 for connection to the single control line conductor 82 and receipt of the constant current control signal 85. The master unit 16 produces the signal 85 in the same manner as described hereinabove. An isolated control means 146 is formed by an optical coupler having an LED radiation source 148 at the input and a pair of reversed parallel connected photodiodes forming the radiation detector 149. The radiation source 148 corresponds to the radiation source 107 and is connected serially to the input terminal 144. The radiation source 148 forms the control input portion to a power switching circuit 150 corresponding to the circuit 94. A load status response circuit 152 corresponds to the circuit 96 described above.

The power switching circuit 150 includes the power relay or load contactor 98 as described above and an operating voltage source 153 formed by a low voltage power supply such as including a step down transformer. The transformer primary is connected by a pair of conductors 154 across the power conductors 20 and 21 through a pair of high current protecting fuses 155. The power supply secondary provides a nominal twenty eight volts at secondary connected conductors 156 and 157. The voltage source 153 and conductors 156 and 157 generally correspond to the line and load terminals 87 and 89 used to supply operating voltages to the disconnect unit 12 from the power conductors.

The radiation detector 149 output of the isolated control means 146 is connected in series with the conductor 156 and directly in series with the conductor 158 which is connected to the actuator element 104 of the contactor 98. The conductor 159 is connected to the other side of the actuator element 104 and the conductor 157. The radiation detector 149 forms the actuating input function of the circuit 150 and eliminates the SCR 112 and associated circuitry of the unit 12. When the control signal 85 is received at the terminal 144, the radiation source 148 is energized to optically activate the radiation detector 149. The actuator element 104 is energized from the twenty eight volt source directly through the radiation detector 149. The load to be controlled 32 is turned off by the load contactor 98.

The load status response circuit 152 is connected to the conductors 158 and 159 at junctions 160 and 161, the latter being ground. The diode 162, resistors 164 and 168 and the capacitor 170 form a half rectifier circuit corresponding to that formed by the diode 122, resistors 122 and 124 and capacitor 126. A further and second isolated control means 172 of the unit 142 is formed by an optical coupler having an LED radiation source 174 forming an input connected as is the radiation source 130. A photo darlington pair radiation detector 176 in the isolated control means 172 is directly connected in parallel with the resistor 138 so as to form part of a variable impedance circuit 180 corresponding to the variable impedance circuit 134 as well as forming the isolated and insulated output of the isolated control means 172.

The operation of the load status response circuit 152 is opposite from that of the circuit 96 in that the radiation detector 176 is normally not activated and is only activated when the conductors 158 and 159 are energized to turn-off the load to be controlled 32. The logic of the binary control line status indicating signal 58 and associated circuits in the LMT logic circuit 40 is correspondingly modified. The higher and lower impedance values produced by the variable impedances 180 causes the corresponding changes in the electrical voltage condition at the input terminal 144 in a similar manner that changes occur at the input terminal 81 as described for the variable impedance circuit 134 hereinabove. Accordingly, the voltage at the terminal 144 changes from low to high values as the constant current of the control signal 85 is received and thereafter the load 32 changes from an energized to a deenergized condition.

While preferred embodiments of the load control system 10 have been described hereinabove, it is apparent to those skilled in the art that obvious modifications and substitutions may be made without departing from the spirit and scope of this invention. For example, various numbers of loads such as loads to be controlled 32 and 34 may be controlled by using corresponding numbers of the remote load sensing and disconnect units such as the unit 12 described in detail hereinabove. It is also contemplated that the control line status circuit 66 may be omitted in some systems and that the junction 74 will be directly connected to the output 76 in the master unit 16. It is also contemplated that alternate techniques may be used for detecting a change in an electrical condition on the control line circuit due to changes corresponding to the changes produced by the variable impedance circuits 134 and 180 for monitoring the status of the load 32.

I claim:

1. A protective load sensing and disconnect arrangement for a remote load control system comprising:
   a pair of power terminals for connecting a load to be controlled to a power line source of electric power energization;
   a single control terminal for receiving a control signal;
   power switching means including a switch connected between said power terminals, said power switching means further including actuating circuit means for producing closed and open states of said switch to selectively energize and deenergize said load to be controlled, and said power switching means further including first isolated control means having a pair of inputs connected in series with said single control terminal and electrically isolated from a pair of outputs thereof, said pair of outputs being connected with said actuating circuit means so that said first isolated control means is selectively activated by said control signal to cause said actuating circuit means to effect an open switch state and deenergize said load to be controlled;
   load status response means connected to one of said power terminals and including second isolated control means having a pair of inputs responsive to the energization and deenergization of said load to be controlled and electrically isolated from a pair of outputs thereof, said second isolated control means being selectively activated and deactivated in response to the energization and deenergization, respectively, of said load to be controlled, said load status response means further including variable impedance means connected and responsive to said pair of outputs of said second isolated control means so that lower and higher impedance values are produced therein in response to the activation and deactivation of said second isolated control means; and
   said variable impedance means further being operatively connected with said single control terminal so as to vary an electrical condition at said single control terminal when said control signal is received thereat for initiating and maintaining the deenergization of said load to be controlled wherein the variations of said electrical condition correspond to the changes between energization and deenergization of said load to be controlled.

2. The protective load sensing and disconnect arrangement as claimed in claim 1 wherein said switch includes a load contactor having switch contacts and an actuator element, and wherein said actuating circuit means includes a solid state switch means connected with said actuator element of said load contactor in a series circuit connected to the other of said power terminals so as to be connected across an operating voltage produced by said power line source of electric power energization, and further wherein said switch is biased in response to said pair of outputs of said first isolated control means so as to be operative between conductive and non-conductive states in response to said first isolated control means being activated by said control signal.

3. The protective load sensing and disconnect arrangement as claimed in claim 2 wherein said actuator element of said load contactor includes a time delay response for opening and closing the associated switch contacts of said load contactor following the energization and deenergization of said actuator element from said other of said power terminals.

4. The protective load sensing and disconnect arrangement as claimed in claim 2 wherein each of said first and said second isolated control means includes an optical coupler having a radiation source connected between said pair of inputs and a radiation detector connected between said pair of outputs, and wherein said variable impedance means is connected in a common series circuit with said pair of inputs of said first isolated control means and with said single control terminal.

5. The protective load sensing and disconnect arrangement as claimed in claim 4 wherein said variable impedance includes a parallel circuit having a fixed impedance element in one branch thereof and a solid state control device in the other branch thereof switchable between high and low conductive states in response to said pair of outputs of said second isolated control means.

6. A remote load control system comprising:
a master controller and monitoring unit including an output terminal and a control signal source for producing a control signal to said output terminal in response to a load turn-off command, said master controller and monitoring unit further including a status monitoring circuit connected with said output terminal;
single conductor means connected to said output terminal;
a load sensing and disconnect unit including a control input terminal connected to said single conductor means, input and output power terminals, a power switching means having an output including a pair of switch contacts connected between said input and output power terminals and operative between normally closed and open switch states, said power switching means having an input electrically isolated from said control input terminal and responsive to said control signal applied from said single conductor means so as to operate said switch contacts between said normally closed and open switch states, load status response means including an input and an output electrically isolated from each other, said input being connected to said output power terminal and said output including a variable electrical means being variable in response to energized and deenergized conditions at said input to said load status response means, said variable electrical means being connected with said control input terminal so as to vary an electrical condition thereat so that said status monitoring circuit in the master unit is rendered operative to indicate the load energizing and deenergizing condition of said output power terminal.

7. The remote load control system as claimed in claim 6 including plural ones of said remote sensing and disconnect unit, plural ones of said master controller and monitoring unit and plural ones of said single conductor means for separately connecting each of the plural load sensing and disconnect units to each of the master controller and monitoring units.

8. The remote load control system as claimed in claim 6 wherein said status monitoring circuit in the master unit includes a current limiter means connected in series with said control signal source and said outut terminal, and further wherein said status monitoring circuit includes an output and is responsive to the changes in the voltage at said control input terminal when produced by said variable electrical means of said load sensing and disconnect unit so as to produce binary logic signals having low and high binary states at said output thereof in response to the load deenergizing and energizing conditions at said power output terminal.

9. The remote load control system as claimed in claim 8 wherein said master controller and monitoring unit includes another status monitoring circuit connected in series with said control signal source and said output terminal, said another status monitoring circuit means including an output and being responsive to said control signal being produced at said output terminal so as to provide a binary logic signal at said output having high and low binary states responsive to the presence and absence of said control signal at said output terminal.

10. The remote load control system as claimed in claim 9 wherein said variable electrical means includes a variable impedance circuit operative in response to said load deenergizing and energizing input conditions to said load status response means wherein the impedance thereof varies between high and low impedance conditions and wherein corresponding changes in voltage occur at said control input terminal of the disconnect unit to produce said binary logic signals at the output of the first-named status monitoring circuit, and further wherein said another status monitoring circuit maintains the binary signal state at the output thereof indicating the presence of said control signal at said output of the master unit independently of the variations in said variable impedance circuit.

* * * * *